United States Patent
Kasahara

(10) Patent No.: US 10,384,483 B2
(45) Date of Patent: Aug. 20, 2019

(54) CONTOUR DETECTING DEVICE, PRINTING DEVICE, CONTOUR DETECTING METHOD AND STORAGE MEDIUM

(71) Applicant: CASIO COMPUTER CO., LTD., Shibuya-ku, Tokyo (JP)

(72) Inventor: Hirokiyo Kasahara, Kusatsu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/053,554

(22) Filed: Aug. 2, 2018

(65) Prior Publication Data

US 2019/0084331 A1 Mar. 21, 2019

(30) Foreign Application Priority Data

Sep. 21, 2017 (JP) .................................. 2017-180795

(51) Int. Cl.
| | |
|---|---|
| *B41M 5/00* | (2006.01) |
| *G06T 3/40* | (2006.01) |
| *G06T 7/13* | (2017.01) |
| *G06T 7/62* | (2017.01) |
| *B41J 3/407* | (2006.01) |
| *G06T 7/64* | (2017.01) |

(52) U.S. Cl.
CPC ............ *B41M 5/0088* (2013.01); *B41J 3/407* (2013.01); *G06T 3/40* (2013.01); *G06T 7/13* (2017.01); *G06T 7/62* (2017.01); *B41J 3/4073* (2013.01); *G06T 7/64* (2017.01)

(58) Field of Classification Search
CPC ...... B41J 3/407; B41J 3/4073; B41M 5/0088; G06T 3/40; G06T 7/13; G06T 7/64; G06T 7/73; G06T 7/62
See application file for complete search history.

(56) References Cited

U.S. PATENT DOCUMENTS 9,642,436 B2 * 5/2017 Miyamoto ............... B41J 3/407

OTHER PUBLICATIONS

Xudong Cao, et al., "Face Alignment by Explicit Shape Regression," Int. J. Comput. Vis., Dec. 13, 2013, 14 Pages.

* cited by examiner

*Primary Examiner* — Thinh H Nguyen
(74) *Attorney, Agent, or Firm* — Holtz, Holtz & Volek PC

(57) ABSTRACT

A contour detecting device, including: a display; and a processor, wherein the processor obtains a detection target image which is obtained by imaging a detection target, detects a contour of the detection target from the detection target image by performing shape recognition a plurality of times, the shape recognition recognizing a shape of the contour of the detection target, and causes the display to display a detection result of contour detection processing, and in the contour detection processing, for feature points forming contours obtained by performing the shape recognition the plurality of times, variance in the shape recognition that is performed the plurality of times is calculated for each corresponding feature points, and a feature point for which a value of the calculated variance is a set value or greater is determined to be a feature point which has a low reliability.

6 Claims, 9 Drawing Sheets

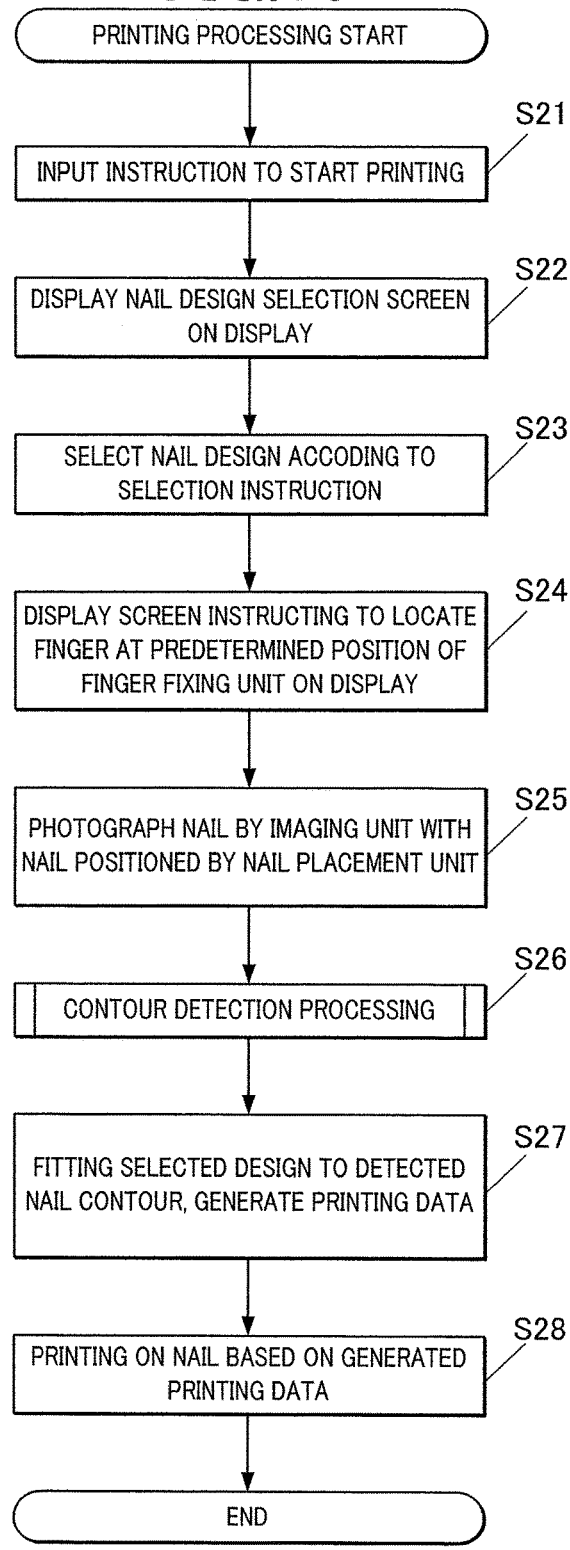

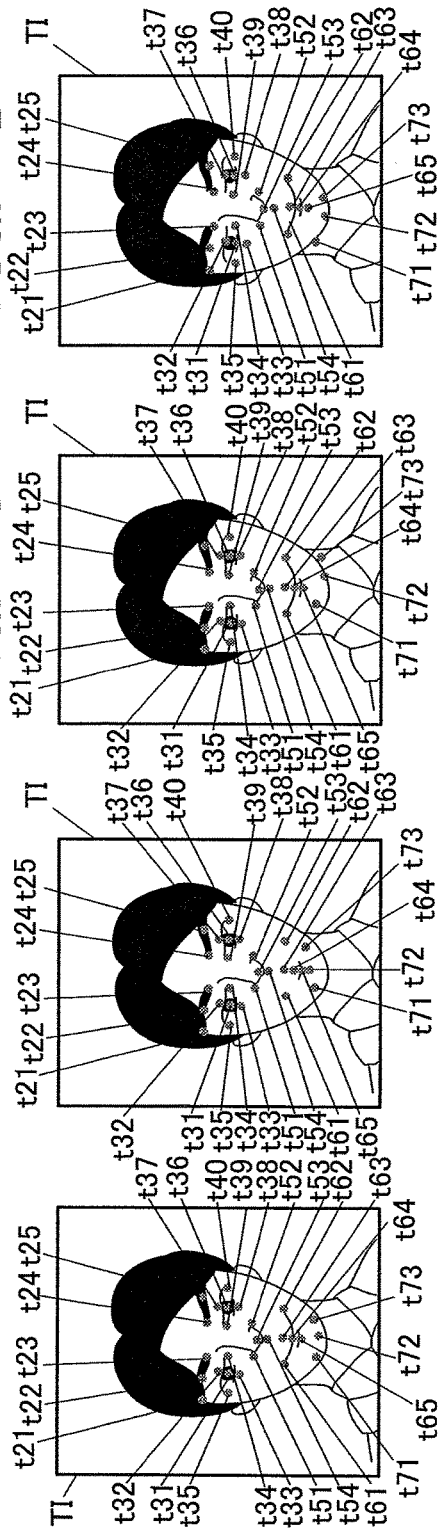

CONTOUR DETECTING DEVICE, PRINTING DEVICE, CONTOUR DETECTING METHOD AND STORAGE MEDIUM

CROSS-REFERENCE TO RELATED APPLICATIONS

This application is based upon and claims the benefit of priority under 35 USC 119 of Japanese Patent Application No. 2017-180795 filed on Sep. 21, 2017 the entire disclosure of which, including the description, claims, drawings, and abstract, is incorporated herein by reference in its entirety.

BACKGROUND OF THE INVENTION

1. Field of the Invention

The present invention relates to a contour detecting device, a printing device, a contour detecting method and a storage medium.

2. Description of Related Art

There has been conventionally known a method for detecting, by image processing, a contour of a detection target from an image which is obtained by imaging the detection target.

For example, in a case where a person is photographed with a camera, the contour of the face of the person and the contours of individual parts such as eyes, nose, mouth and the like can be detected from the photographed image by using the contour detection technique.

The target of the contour detection is not limited to the face and the parts of the face. The contour detection technique can be used for detecting various types of contours such as the contour shape of a nail.

A non-patent document ("Face alignment by Explicit Shape Regression" Xudong Cao, Yichen Wei, Fang Wen and Jian Sun, CVPR 2012:2887-2894) discloses a technique for detecting the contour of the detection target by an algorithm called ESR (Explicit Shape Regression).

Also in ESR, a shape model (initial shape) which has feature points arranged around the center is generated and fitting is performed between the generated shape model and an image including the detection target. As described in the non-patent document, in ESR, the two-scale weak regressors (weak classifiers) are applied in combination to carry out the contour detection in terms of regression problem where the shape model (initial shape) is gradually converged toward the contour of the detection target which is the correct position.

An advantage of the present invention is to provide a contour detecting device, a printing device, a contour detecting method and a storage medium which can easily determine a portion which has a low reliability of detection in a case of automatically detecting the contour of the detection target from the image.

SUMMARY OF THE INVENTION

According to an embodiment of the present invention, there is provided a contour detecting device, including: a display; and a processor, wherein the processor obtains a detection target image which is obtained by imaging a detection target, detects a contour of the detection target from the detection target image by performing shape recognition a plurality of times, the shape recognition recognizing a shape of the contour of the detection target, and causes the display to display a detection result of contour detection processing, and in the contour detection processing, for feature points forming contours obtained by performing the shape recognition the plurality of times, variance in the shape recognition that is performed the plurality of times is calculated for each corresponding feature points, and a feature point for which a value of the calculated variance is a set value or greater is determined to be a feature point which has a low reliability.

According to an embodiment of the present invention, there is provided a printing device, including: a display; a print head; and a processor, wherein the processor obtains a detection target image which is obtained by imaging a detection target, performs contour detection processing of detecting a contour of the detection target from the detection target image by performing shape recognition processing a plurality of times, the shape recognition processing recognizing a shape of the contour of the detection target, causes the display to display a detection result of the contour detection processing, and causes the print head to perform printing in the contour, and in the contour detection processing, for feature points forming contours obtained by performing the shape recognition processing the plurality of times, variance in the shape recognition processing that is performed the plurality of times is calculated for each corresponding feature points, and a feature point for which a value of the calculated variance is a set value or greater is determined to be a feature point which has a low reliability.

According to an embodiment of the present invention, there is provided a contour detecting method, including: obtaining a detection target image which is obtained by imaging a detection target; detecting a contour of the detection target from the detection target image by performing shape recognition processing a plurality of times, the shape recognition processing recognizing a shape of the contour of the detection target; and causing a detection result of the contour to be displayed, wherein in the detecting of the contour, for feature points forming contours which are recognition results of the shape recognition processing, variance in the shape recognition processing that is performed the plurality of times is calculated for each corresponding feature points, and a feature point for which a value of the calculated variance is a set value or greater is determined to be a feature point which has a low reliability.

According to an embodiment of the present invention, there is provided a non-transitory storage medium storing a program that causes a computer of a contour detecting device to perform functions including: obtaining a detection target image which is obtained by imaging a detection target; detecting a contour of the detection target from the detection target image by performing shape recognition a plurality of times, the shape recognition recognizing a shape of the contour of the detection target; and causing a detection result of the detecting of the contour to be displayed, wherein in the detecting of the contour, for feature points forming contours which are recognition results of the shape recognition, variance in the shape recognition that is performed the plurality of times is calculated for each corresponding feature points, and a feature point for which a value of the calculated variance is a set value or greater is determined to be a feature point which has a low reliability.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 10 is a flowchart showing printing processing in the embodiment;

FIGS. 11A to 11E are views showing the positions of feature points in a case of fitting respective initial shapes to the detection target image;

FIG. 11F shows merged recognition results of FIGS. 11A to 11E; and

FIG. 11G is a view showing the state of enlarged display of a portion for which variance is a threshold value or greater as a result of merging the recognition results.

DETAILED DESCRIPTION OF THE PREFERRED EMBODIMENT

Figure 1:
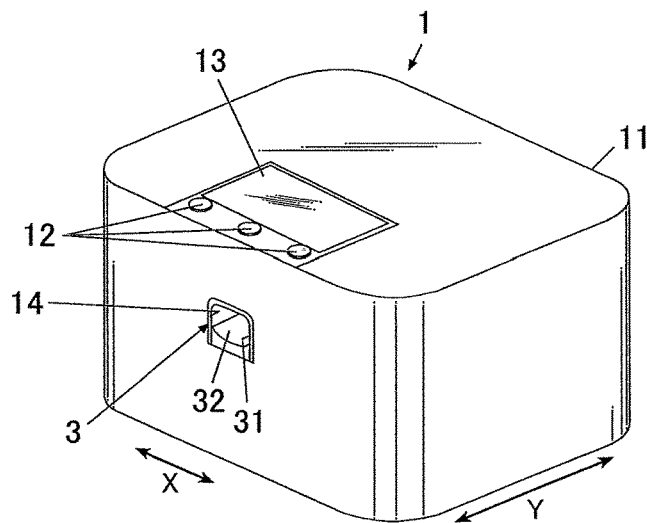
FIG. 1 is a schematic view showing an outer configuration of a contour detecting device in an embodiment.

With reference to FIGS. 1 to 7, a first embodiment of a contour detecting device according to the present invention will be described.

The following embodiment will be described by taking, as an example, a case where a finger nail is a detection target for which the contour is detected.

Hereinafter, although various limitations which are technically preferred to execute the present invention are adopted, the scope of the present invention is not limited to the following embodiments or the examples shown in the drawings.

FIG. 1 is a schematic view showing the outer view of a contour detecting device according to the embodiment.

As shown in FIG. 1, the contour detecting device 1 according to the embodiment includes a case 11 formed in an approximate box shape.

The operating unit 12 is set on the upper surface (top board) of the case 11.

The operating unit 12 is an input unit where a user carries out various types of inputs.

The operating unit 12 includes operating buttons for carrying out various types of inputs such as a power switch button for turning on the power of the contour detecting device 1, a stop switch button for stopping the operation, a detection start button for giving an instruction to start the contour detection of a nail T and the like.

Further, the display 13 is set on the upper surface (top board) of the case 11.

The display 13 is a display which displays a detection result by an after-mentioned contour detector 813 (see FIG. 3) which is a contour detector.

The display 13 is formed of a liquid crystal display (LCD), an organic electroluminescence display, other flat display or the like, for example.

In the embodiment, for example, various instructions, a nail image (a finger image including the image of the nail T) which is obtained by imaging a finger U1, an image of a contour line or the like of the nail T which is included in the nail image, instruction screens for displaying various instructions and the like are displayed on the display 13 as needed.

The display 13 as a display displays the portion, which was determined to be a feature point t having a low reliability by the contour detector 813 that is a contour detector, so as to be distinguished from the other portion, as described later.

In the embodiment, as a method for displaying the portion to be distinguished from the other portion by the contour detector 813, the portion which was determined to be the feature point t having a low reliability is displayed so as to be enlarged on the display 13.

Here, a touch panel input unit 121 (see FIG. 3) is integrally configured with a display panel (not shown in the drawings) in the surface of the display 13 in the embodiment.

The touch panel input unit 121 is configured so that various types of input operation can be performed by a touch operation of touching the surface of the display 13 with a fingertip or an input member such as a stylus pen (not shown in the drawings, hereinafter, simply referred to as a "pen") or a pointed stick writing tool, for example, and functions as an operator.

Furthermore, in the front surface side (the near front side in FIG. 1) of the case 11, there is formed an opening 14 for inserting and setting the finger U1 at the imaging position where imaging can be carried out by the imaging unit 50 at the time when imaging is to be carried out by the contour detecting device 1, the finger U1 corresponding to the nail T which is the detection target.

The finger fixing unit 3 which fixes the nail T (the finger U1 including the nail T) which is the detection target in the embodiment is disposed inside the opening 14.

Figure 2A:
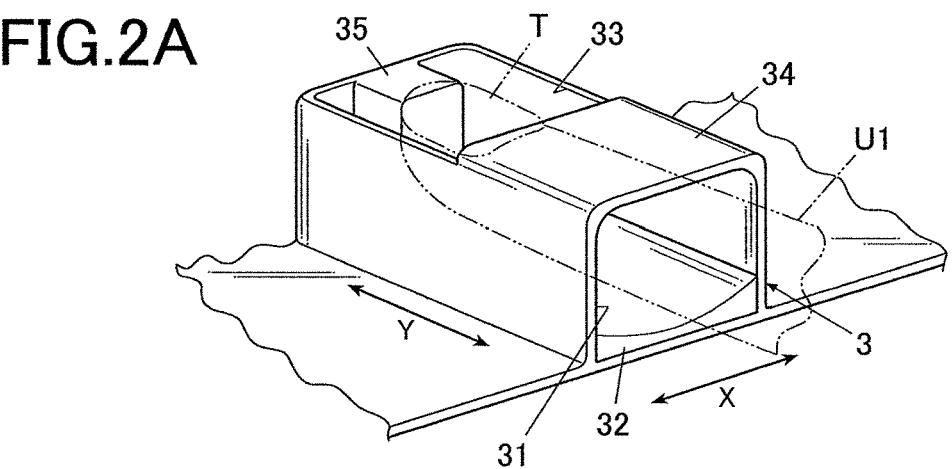
FIG. 2A is a schematic view showing a finger fixing unit.
Figure 2B:
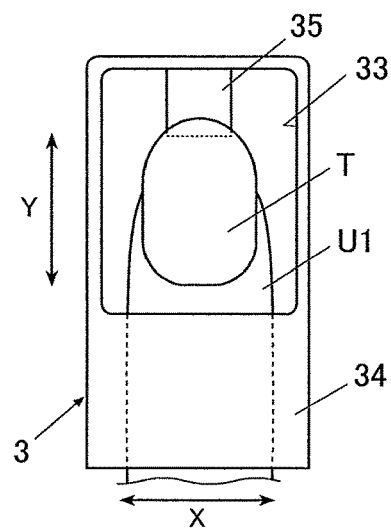
FIG. 2B is a plan view of the finger fixing unit seen from above.

FIG. 2A is a schematic view showing the finger fixing unit 3, and FIG. 2B is a plan view of the finger fixing unit 3 seen from above.

In FIG. 2A, the state in which the finger U1 including the nail T is placed in the finger fixing unit 3 is shown by the two-dot chain line.

As shown in FIG. 2A, the finger fixing unit 3 is a box-shaped member including an opening 31 in the near front side of the device, and the finger fixing member 32 for fixing the finger U1 is disposed inside the finger fixing unit 3. In the finger fixing unit 3, the opening 31 is placed at a position corresponding to the opening 14 of the case 11 in the case 11.

The finger fixing member 32 is for supporting the finger U1 while pushing the finger U1 upward from below and for example, it is formed of a resin or the like having flexibility. The configuration of the finger fixing member 32 is not especially limited as long as it supports the finger U1 from below and enables contour detection. For example, the finger fixing member 32 may be forced from below by an elastic member such as a spring. For example, the finger fixing member 32 may be configured to be capable of expansion and contraction by changing the inner pressure, and push up the finger U1 in the expanded state to fix the position.

The back part of the upper surface of the finger fixing unit 3 is a window 33, and the nail T of the finger U1 which is inserted in the finger fixing unit 3 is to be exposed from this window 33.

Moreover, the front side part of the upper surface of the finger fixing unit 3 is a finger holder 34 which controls the position of the finger U1 in the upper direction by preventing the finger U1 from rising upward. The positions of the finger U1 and the nail T thereof in the height direction are positioned at predetermined positions by being supported by the finger fixing member 32 from below and by the upper side of the finger U1 being pressed by the finger holder 34.

Further, in the embodiment, the nail placement unit 35 on which the nail T is to be placed is formed in the back in the finger inserting direction. By placing the tip of the nail T on the nail placement unit 35, the position of the nail T in the horizontal direction (that is, in the X direction and in the Y direction) is decided and the position of the nail T in the height direction is also decided.

Figure 3:
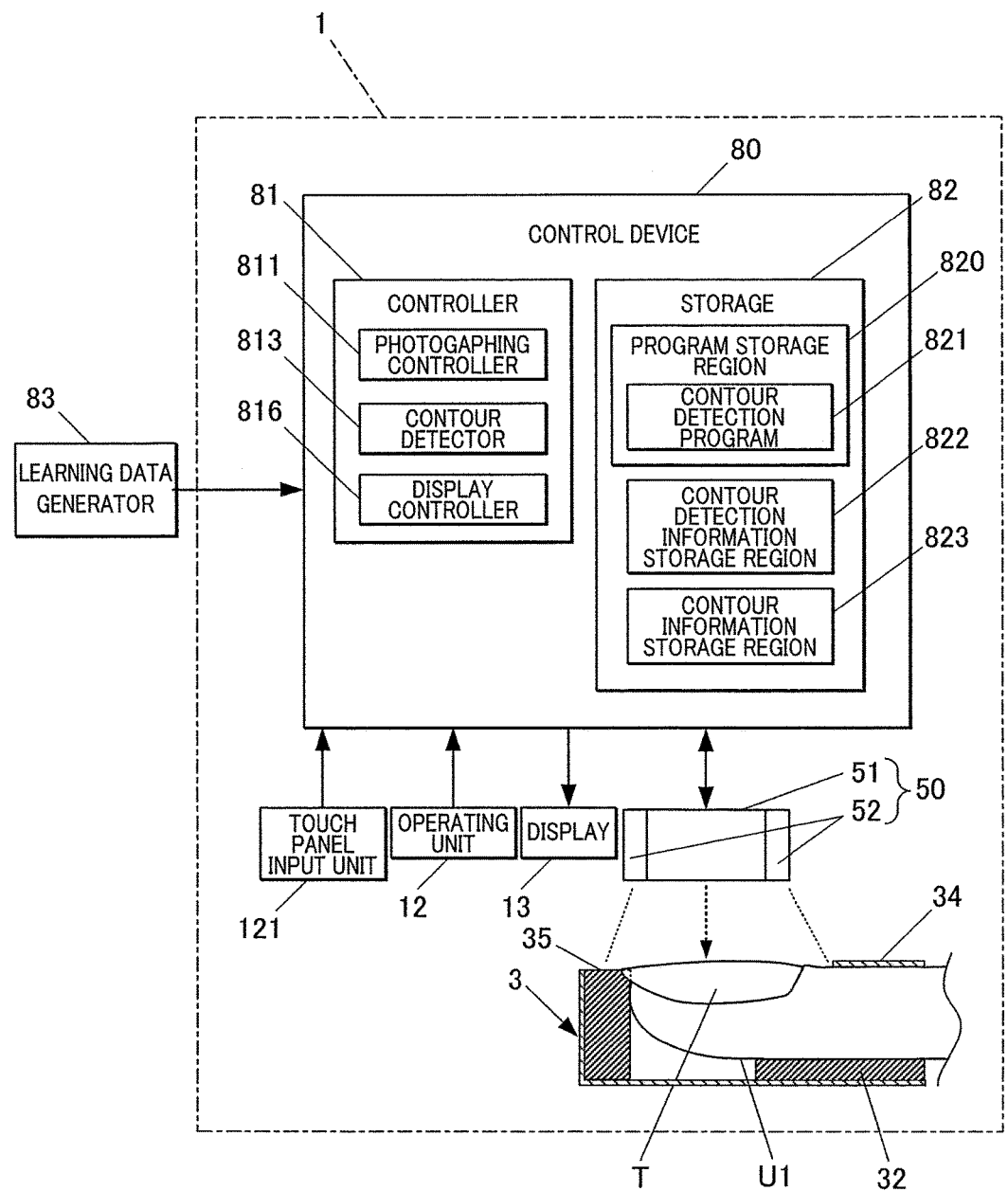
FIG. 3 is a main part configuration view showing a functional configuration of the contour detecting device in the embodiment.

FIG. 3 is an explanation view functionally showing the main part configuration of the contour detecting device in the embodiment.

As shown in FIG. 3, the imaging unit 50 is disposed above the position where the nail T is placed when the finger U1 is inserted in the finger fixing unit 3.

The imaging unit 50 includes a imaging device 51 and lighting devices 52.

The imaging device 51 is a small-sized camera including a solid state image sensor of over two million pixels, a lens and the like, for example.

The lighting devices 52 are illuminating lights of white LEDs or the like, for example. In the embodiment, a plurality of lighting devices 52 is disposed so as to surround the imaging device 51.

Here, the position of the imaging device 51 and the positions of the lighting devices 52 are not limited to the positions exemplified in the drawing. For example, the imaging device 51 and the lighting devices 52 of the imaging unit 50 may be disposed and fixed at the position above the nail T. Alternatively, in the case where the imaging unit 50 is structured so as to move by a moving unit, it is sufficient that the imaging unit 50 can be moved to the position above the nail T.

The imaging unit 50 is a imaging unit which obtains a detection target image TI (that is, nail image which is an image of the finger U1 including the nail T) including the region of the detection target (nail T) by imaging the nail T which is a detection target. In the embodiment, imaging is carried out by the imaging unit 50 in the state in which the nail T is positioned by the nail placement unit 35.

The imaging unit 50 is connected with the imaging controller 811 of the after-mentioned control device 80 and is to be controlled by the imaging controller 811.

Here, the image data of the image which is photographed by the imaging unit 50 may be stored in the after-mentioned storage 82.

Further, as shown in FIG. 3, the contour detecting device 1 of the embodiment includes the control device 80.

The control device 80 is disposed on a board or the like (not shown in the drawings) which is disposed on the under surface of the top board of the case 11, for example.

The control device 80 is a computer including the controller 81 which is configured by including a CPU (central processing unit) (not shown in the drawings), and the storage 82 configured by including a ROM (Read Only Memory), a RAM (Random Access Memory) (both not shown in the drawings) and the like.

The storage 82 includes a program storage region 820 where various types of programs such as a contour detection program 821 for operating the contour detecting device 1 are stored.

Further, in the embodiment, the storage 82 includes the contour detection information storage region 822 for storing contour detection information used for detecting the contour of the nail T from the image by the contour detector 813, the contour information storage region 823 for storing information on the contour of the nail T detected by the contour detector 813, and the like.

The contour detection information stored in the contour detection information storage region 822 is learning data which is obtained by the learning performed in advance, such as the coordinate values of the respective feature points t forming the contour Tmb of the initial shape Tm which is a shape model, the position of the center Tc of the initial shape Tm and a regressor (classifier) formed of a displacement function (regression function).

As described later, in the embodiment, the contour or the like of the nail T which is the detection target is detected by the contour detector 813 on the basis of the learning data as the learning result.

The contour detection information (learning data) stored in the contour detection information storage region 822 is generated by a learning data generator 83.

That is, the learning data generator 83 obtains a plurality of images (learning images) as a learning sample (sample nail TL in the embodiment) which was obtained by photography using the contour detecting device 1. The learning data generator 83 performs learning by using the plurality of images (learning images) of the learning sample, and generates learning data as the learning result.

Specifically, the learning data generator 83 performs feature extraction of extracting the feature amount which is useful for contour detection from each of the learning images. The feature amount is, for example, the brightness value or the color of each pixel, or the change amount of the brightness value or the color between adjacent pixels. When the feature amounts are extracted, the learning data generator 83 generates data of x, y coordinate values of the feature points representing the shape of the nail region for each learning image, and associates the x, y coordinate value data with each learning image.

Further, the learning data generator 83 performs pattern learning by using the data of the x, y coordinate values of the feature points associated with each learning image, and generates learning data as the learning result formed of the initial shape Tm (coordinate values of feature points t forming the contour Tmb of the initial shape Tm) which looks like the nail T that is the detection target, the center Tc of the initial shape Tm, the classifier and the like. The learning is normally performed by machine learning.

Since the learning target image is the base for generating the learning data, it is preferable that the learning target image is obtained under as same condition as possible as the data of nail T which is the detection target.

Thus, for example, it is preferable that imaging is performed by the imaging unit 50 in a state in which the sample nails TL which are the learning target and the nail T which is the detection target are positioned by using the same nail placement unit 35 to obtain the nail images (learning image and detection image).

By this, the nail positions in the nail images are nearly same, and the photography conditions are also nearly same since photography can be performed by the imaging unit 50 of a similar configuration.

Here, the "same" nail placement unit 35 does not mean the same nail placement unit of the completely same device, but means the similar nail placement unit 35 and imaging unit 50 in a device including a similar configuration.

That is, the acquisition of learning target image by imaging the learning samples and generation of learning data using the learning target image are completed by the stage of factory shipment, and the learning results are stored in the contour detection information storage region 822 in advance as the contour detection information. Thus, acquisition of learning target image and the like are performed by using a model machine before shipment, whereas acquisition of the detection target image and the like are performed by individual devices by respective users.

Thus, there is used a device which includes a same configuration and a same member and can obtain data under the same condition, though the device is less likely to be the completely same device and the device is a different device as individual.

Figure 4:
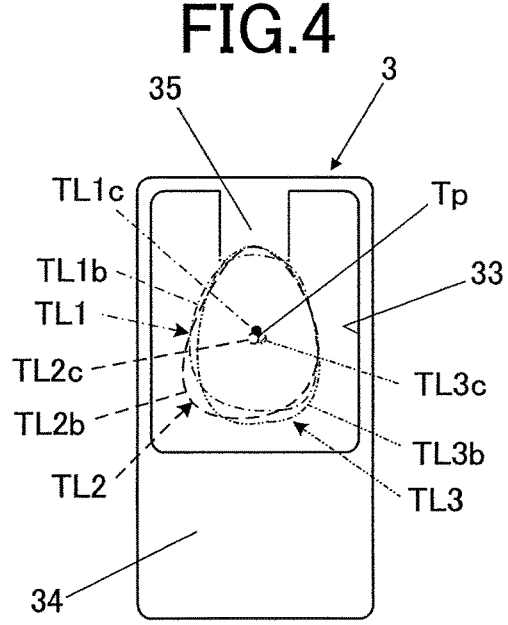
FIG. 4 is a view schematically showing a state in which sample nails are placed in the finger fixing unit.

FIG. 4 schematically shows the state in which a plurality of nails gathered as learning samples (sample nails TL1 to TL3 in the embodiment) is placed in the finger fixing unit 3, and the tip of the nail TL is placed to be positioned on the nail placement unit 35. In FIG. 4, the sample nail which is the first learning sample, the sample nail which is the second learning sample and the sample nail which is the third learning sample are respectively referred to as TL1 (shown by one-dot chain line in FIG. 4), TL2 (shown by dashed line in FIG. 4) and TL3 (shown by two-dot chain line in FIG. 4). FIG. 4 schematically shows the sample nails TL1 to TL3 so as to be superposed on each other though the sample nails TL1 to TL3 are actually placed in the finger fixing unit 3 sequentially one by one.

In FIG. 4, the centers of the sample nails TL1 to TL3 are respectively referred to as TL1$c$, TL2$c$ and TL3$c$. The average center which is the average value of the centers TL1$c$ to TL3$c$ is referred to as the average center Tp.

Here, the "center" is the point where the sum of the primary moments in the figure (nail (sample nail TL) in the embodiment) is 0.

Though FIG. 4 shows three sample nails TL1 to TL3 as learning samples, the number of the sample nails TL is not limited to this. It can be expected to obtain learning data having a higher reliability if the learning is performed by gathering some degree of large number of sample nails TL.

Figure 5:
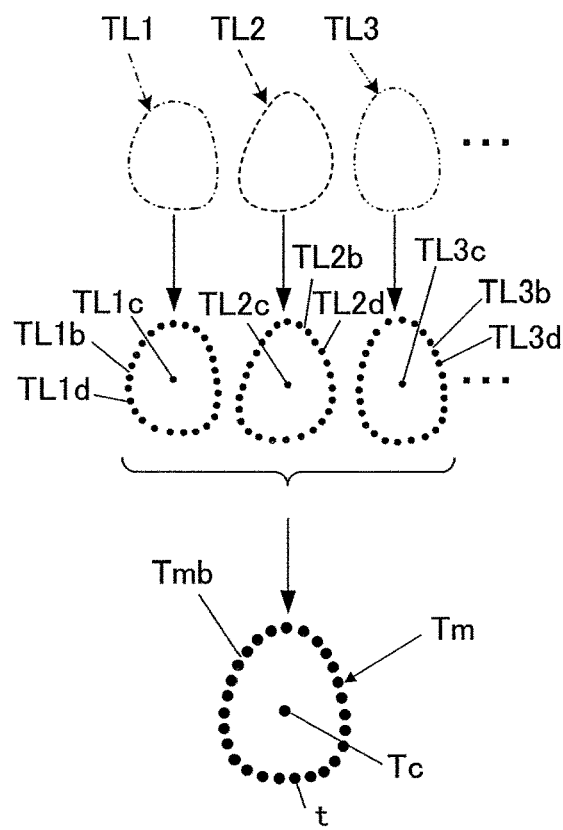
FIG. 5 is an explanation view schematically showing the manner of generating an initial shape from a plurality of sample nails.
Figure 6:
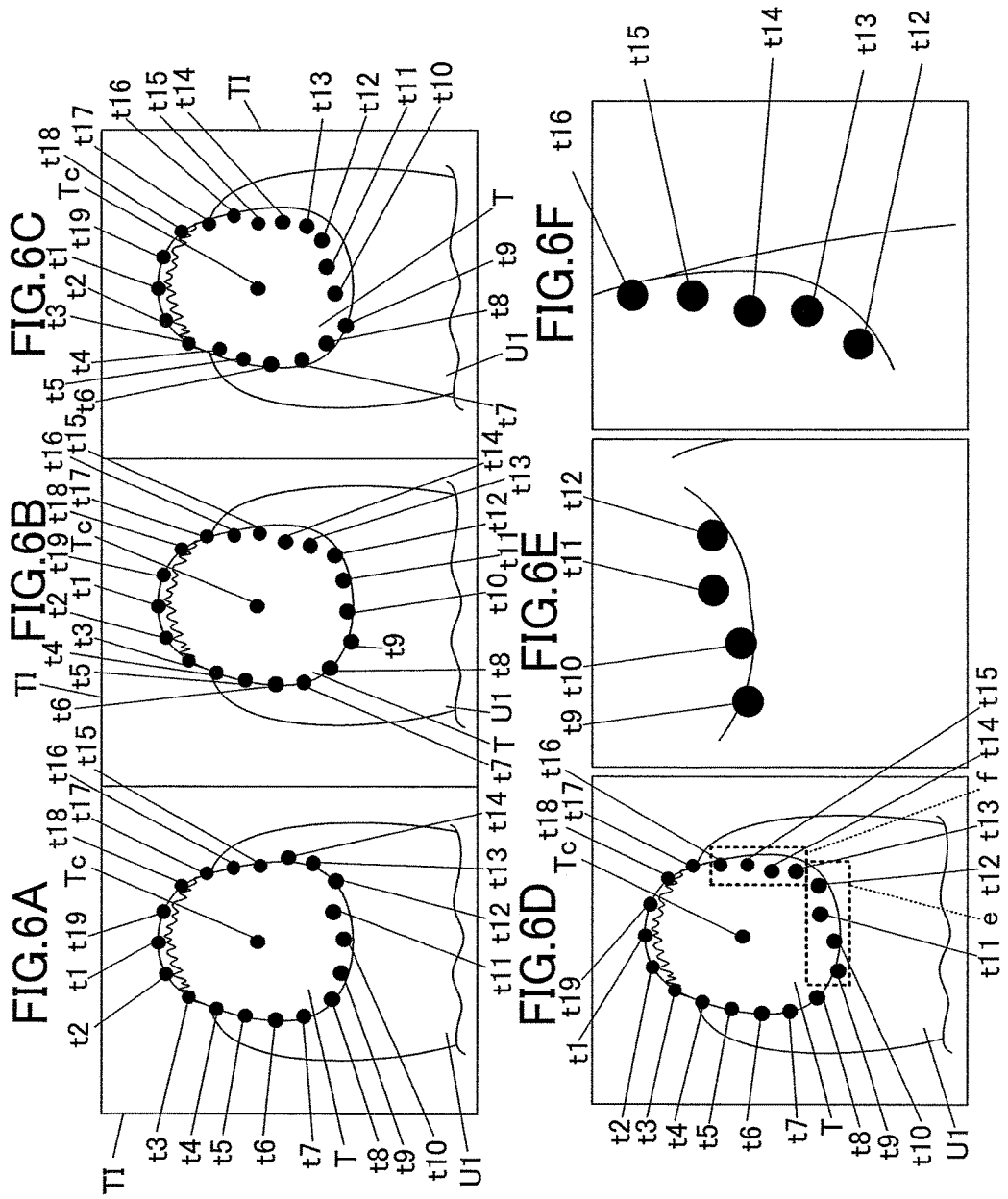
FIGS. 6A to 6C are views showing the positions of feature points in a case of fitting respective initial shapes to the detection target image.
FIG. 6D shows merged recognition results of FIGS. 6A to 6C.
FIGS. 6E to 6F are views showing the state of enlarged display of a portion for which variance is a threshold value or greater as a result of merging the recognition results.

FIG. 5 is an explanation view schematically showing the manner of detecting the contours TL1$b$ to TL3$b$ formed of the feature points TL1$d$ to TL3$d$ and the centers TL1$c$ to TL3$c$ for the sample nails TL1 to TL3 and generating the initial shape Tm (shape model) on the basis of the plurality of sample nails TL1 to TL3.

In the initial shape Tm, the feature points T forming the contour Tmb are set around the center Tc.

The center Tc of the initial shape Tm may be the average value of the centers TL1$c$ to TL3$c$ of all the sample nails TL1 to TL3, or may be the position selected by any weighting. The feature points $t$ of the initial shape Tm may be average values of the respective feature points TL1$d$ to TL3$d$ of all the sample nails TL1 to TL3, or may be randomly selected from among the respective feature points TL1$d$ to TL3$d$ of all the sample nails TL1 to TL3.

In a functional view, the controller 81 includes the imaging controller 811, the contour detector 813, the display controller 816 and the like. The functions as the imaging controller 811, the contour detector 813, the display controller 816 and the like are achieved by cooperation between the CPU in the controller 81 and the programs stored in the ROM of the storage 82.

The imaging controller 811 controls the imaging device 51 and the lighting devices 52 of the imaging unit 50 to cause the imaging device 51 to photograph the image (nail image, "detection target image TI") of the finger including the image of the nail T of the finger U1 which is fixed to be positioned by the nail placement unit 35 of the finger fixing unit 3.

The contour detector 813 is a contour detector which performs contour detection processing of detecting the contour (coordinate values of feature points forming the contour) of the nail T which is the detection target from the detection target image TI.

In the embodiment, the contour detector 813 detects the contour of the nail T by using the method of ESR (Explicit Shape Regression).

That is, the contour detector 813 generates the initial shape Tm (shape model) arranging the feature points t around the center Tc, and performs fitting between the generated initial shape Tm and the image including the region of the nail T which is the detection target.

As described in the non-patent document, in the contour detection using ESR, contour detection is performed by applying the two-scale weak regressors (weak classifiers) in combination in terms of regression problem where the initial shape Tm (shape model) is gradually converged toward the contour of the detection target which is the correct position.

Specifically, when the detection target image is input, the contour detector 813 arranges the initial shape Tm at an appropriate position (initial position) in the detection target image TI.

Since the method such as ESR of performing contour detection as the regression problem is excellent in robust property compared with the method such as AAM of performing contour detection by fitting the shape model, the influence on accuracy in detection result is small even if the setting is not so strict regarding the type of initial shape Tm and the initial position to arrange the initial shape Tm.

Thus, a common initial shape Tm can be applied even in a case where the input detection target image TI has a different size of nail T, different thickness of finger U1 and the like.

In the embodiment, the contour detector 813 arranges the initial shape Tm so that the center Tc of the initial shape Tm is located at or near the position of the average center Tp which is the average value of centers in the learning data.

When the initial shape Tm is arranged, the contour detector 813 performs displacement of the initial shape Tm a plurality of times with the regressors (two-scale weak classifiers in a case of ESR) formed of the displacement function (regression function) generated by learning in advance and stored in the contour information storage region 823 of the storage 82 in advance. The contour detector 813 causes the initial shape Tm to be gradually converged toward the contour (that is, border of the nail region) of the nail T which is the correct position.

By performing displacement of the initial shape Tm so that the features points t come close to the contour of the nail T in such a way, the contour detector 813 finally estimates the contour of the nail T.

In the embodiment, the contour detector 813 performs the above-described shape recognition processing (that is, processing of causing the initial shape Tm to be gradually converged toward the contour of the nail T to detect the contour of nail T) a plurality of times.

FIGS. 6A to 6C are views showing the detection results obtained by performing the shape recognition processing. In the embodiment, there is shown an example of setting 19 feature points t (t1 to t19) counterclockwise from the nail tip as the top around the Tc which is the center of the detected contour Tmb. The number of the feature points t to be set, how to arrange the feature points t and the like are not especially limited, and may be set appropriately.

Though FIGS. 6A to 6C show the detection results for the shape recognition processing performed three times, the number of repeating the shape recognition processing is not limited to three. The number to repeat the shape recognition processing is appropriately set.

The contour detector 813 calculates a variance for each of the feature points t forming the contours as the detection results in the shape recognition processing which was performed a plurality of times. At this time, it is preferable that the contour detector 813 repeats the shape recognition processing while changing the position to arrange the initial shape Tm at each time of shape recognition processing. The way and the degree of amount to shift the initial position to arrange the initial shape Tm are matters which can be set appropriately.

Since the method such as ESR of performing contour detection as the regression problem is excellent in robust property as mentioned above, even in the above case of performing the shape recognition processing while changing the location of the initial shape Tm to some degree, many of the feature points t are detected at nearly same positions each time, and the variance is small (for example, the feature points t1 to t8 and the feature points t17 to t19 in FIGS. 6A to 6C).

However, the variance of the feature point t is large for the portion where the contour cannot be detected easily, such as the portion whose brightness difference from the surrounding portion is small (for example, feature points t9 to t16 in FIGS. 6A to 6C).

When there is a feature point t having the variance which is a predetermined value or greater (feature points t9 to t16 in FIGS. 6A to 6C), the contour detector 813 determines the feature point t as the feature point t having a low reliability.

Specifically, for example, a threshold value of variance is stored in advance in the contour detection information storage region 822 of the storage 82, and the contour detector 813 determines that the feature point t, for which the calculated variance is larger than the threshold value, as the feature point t having a low reliability. The degree of the threshold value to be set is a matter to be appropriately determined. The threshold value may not be especially set and the feature points t having larger variances may be determined to have low reliabilities.

Further, the contour detector 813 merges the detection results of the shape recognition processing performed a plurality of times. The value of the merging result may be the average value or the median value of the detection results of the shape recognition processing that was performed a plurality of times, for example.

FIG. 6D shows the merging result of merging the recognition results of the shape recognition processing shown in FIGS. 6A to 6C.

In the example shown in FIG. 6D, the variance is large for the feature points t9 to t12 around the root of the nail T and the feature points t13 to t16 around the right side of the nail T (respectively surrounded by dashed lines in FIG. 6D).

The contour detector 813 determines the feature points t having variances that are the predetermined value or greater (feature points t9 to t16 in FIGS. 6A to 6C) as the feature points having low reliabilities.

The display controller 816 controls the display 13 to display various display screens on the display 13. In the embodiment, the display controller 816 causes the display 13 to display the selection screen of the nail design, thumbnail images for design confirmation, the nail image obtained by imaging the printing finger U1, various instruction screens, operation screens and the like, for example.

In the embodiment, the display controller 816 causes the display 13 to display the detection results by the contour detector 813.

In a case where there is a portion where the contour detector 813 determined the feature point t to have a low reliability, the display controller 816 controls the display 13 to display so that the portion (feature point t determined to have a low reliability, including the surrounding portion as needed) can be distinguished from the other portion.

In the embodiment, as shown in FIGS. 6E to 6F, the display controller 816 causes the display 13 to sequentially display, on the display screen, the enlarged image of the feature points t9 to t12 (see FIG. 6E) around the root of the nail T and the enlarged image of the feature points t13 to t16 (see FIG. 6F) around the right side of the nail T.

In a case where there is a plurality of portions where the feature point t was determined to have a low reliability, the portion which was determined to have a lower reliability may be displayed with priority.

Though FIGS. 6E to 6F show the example of displaying the plurality of feature points t together in one screen, the display manner is not limited to the illustrated example, and the feature points t having large variances may be sequentially displayed one by one, for example.

The display manner is not especially limited. For example, the image showing the positional relationship between the enlarged portion and the entire detection target (nail T in the embodiment) as shown in FIG. 6D may be displayed with FIGS. 6E and 6F so that the location of the enlarged portion in the entire image can be understood easily.

The method of displaying the portion of the feature point t determined to have a low reliability so as to be distinguished from the other portion is not limited to the enlarged display.

For example, as shown in FIG. 6D, the present portion may be displayed to be surrounded by a frame, or may be displayed by changing the color of the present feature point t to be different from the color of the other portion. An arrow or an annotation such as a comment may be displayed so as to be superposed on the present portion.

In a case where the touch panel input unit 121 is provided in the display 13 as in the embodiment, as shown in FIG. 6D, the screen providing a frame to the present portion may be displayed so that the portion provided with the frame is zoomed when the user performs touch operation or the like to the framed portion on the touch panel.

A plurality of the methods described above may be combined, or a method other than the described methods may be used.

Figure 7:
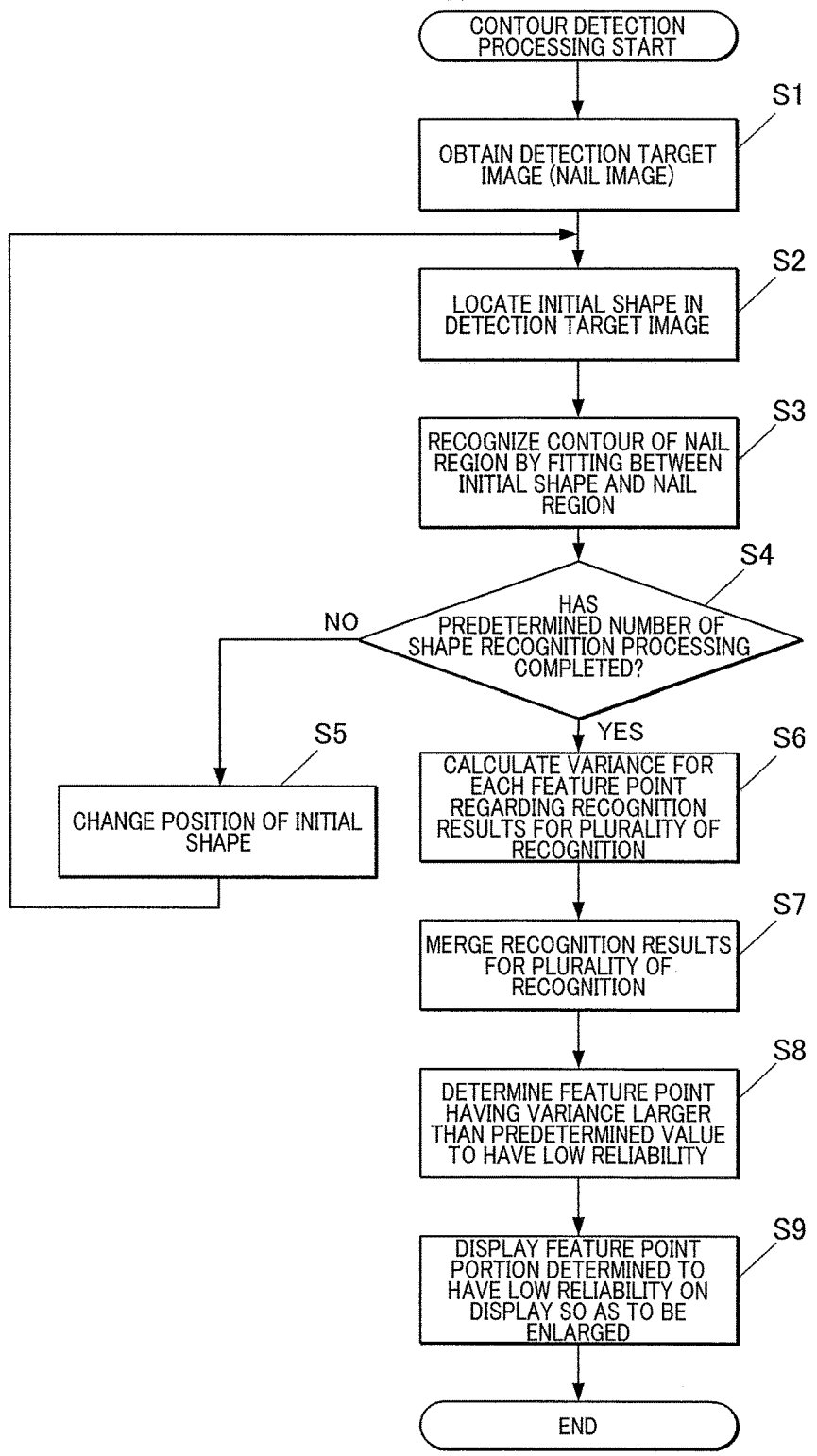
FIG. 7 is a flowchart showing contour detection processing in the embodiment.

Next, with reference to FIG. 7, the contour detecting method by the contour detecting device 1 in the embodiment will be described.

First, as shown in FIG. in the contour detection processing in the embodiment, when the user inserts the finger U1 into the finger fixing unit 3 and operates the switch to start processing in a state in which the nail T which is the detection target is positioned by the nail placement unit 35, the imaging controller 811 operates the imaging unit 50 to photograph the nail T which is positioned by the nail placement unit 35 and obtain the nail image which is the detection target image TI (step S1).

When the detection target image TI is obtained, the contour detector 813 arranges the initial shape Tm so that the center Tc of the initial shape Tm which was obtained by learning in advance and stored in the contour detection information storage region 822 is located at the average center Tp (see FIG. 4) or near the position (step S2).

Next, the contour detector 813 recognizes the contour shape of the nail region by performing fitting between the initial shape Tm and the nail region included in the detection image TI (step S3).

Specifically, displacement is performed by the classifiers a plurality of times so that the individual feature points t of the initial shape Tm come close to the contour of the nail region which is the correct position, and the feature points t are gradually converged toward the correct position.

The contour detector 813 determines whether a predetermined number of shape recognition processing have been completed (step S4). If the shape recognition processing is not performed the predetermined number of times (step S4; NO), the contour detector 813 changes the arrangement position of the initial position (step S5), and repeats the processing from step S2 to S4.

On the other hand, if the shape recognition processing was performed a predetermined number of times (step S4; YES), the contour detector 813 calculates a variance for each of the feature points regarding the recognition results of the shape recognition processing that was performed a plurality of times (step S6).

Further, the contour detector 813 merges the recognition results of the shape recognition processing that was performed a plurality of times (step S7).

The contour detector 813 determines that the feature point portion having the variance larger than the predetermined value is the portion having a low reliability (step S8).

If there is a portion which is determined to have a low reliability of detection by the contour detector 813, the display controller 816 causes the display 13 to perform enlarged display of the portion determined to have a low reliability, that is, the feature point portion (feature points t9 to t16 in FIG. 6D) having a large variance for the merging result (step S9, see FIGS. 6E and 6F).

If there is no feature point t having a variance larger than the predetermined value, the processing may be ended without performing the enlarged display. In this case, the display controller 816 may cause the display 13 to display a message or the like indicating that there is no feature point t having variance larger than the predetermined value. Even if there is no feature point t having a variance exceeding the predetermined threshold value, the feature points t may be displayed in decreasing order of the variance on the display 13 in enlarged display so as to be checked by the user.

In a case where the feature point portion having a large variance (feature points t9 to t16 in FIG. 6D) is displayed so as to be enlarged on the display 13, the user checks the enlarged display screen of the display 13, and performs adjustment to obtain the contour defining the desired nail region by appropriately moving the feature points t located out of the actual contour of nail T by touching or the like the touch panel input unit 121 with a pen, a fingertip or the like if there is a portion which seems to require correction of the detection result. In a case where manual adjustment by the user is performed, the contour after adjustment (feature points t forming the contour) is stored in the contour information storage region 823 as the contour of the nail T of the user which is the detection target.

As a result of checking the display screen of the display 13, if it is determined that the contour defining the desired nail region is detected correctly, the user may operate an OK button or the like (not shown in the drawings) of the operating unit 12 to have the contour which was automatically detected by the contour detector 813 (feature points t forming the contour) as a final detection result. In this case, the automatically detected contour (feature points t forming the contour) is stored in the contour information storage region 823 as the contour of the nail T of the user which is the detection target.

As described above, according to the embodiment, the contour detector 813, which performs contour detection processing of detecting the contour of the nail T from the detection target image TI by performing a plurality of times shape recognition processing of recognizing the shape of the contour of the nail T that is the detection target, calculates a variance for each of the feature points t forming the contour which is the recognition result in each of the shape recognition processing that was performed a plurality of times, and determines the feature point(s) t having variance (s) which is a predetermined value or greater as the feature point(s) t having a low reliability. Then, the portion where the feature point(s) t was determined to have a low reliability by the contour detector 813 is displayed on the display 13 so as to be able to be distinguished from the other portion.

Thus, in a case where there is a portion which was possibly not detected accurately in automatic contour detection by the contour detecting device 1, it is possible to show the portion so as to be easily recognized.

Thus, it is possible to call user's attention, and obtain a more correct contour shape by the user sequentially checking the feature points) t of the region displayed so as to be enlarged on the display screen without troublesome work of visually searching for the portion which was detected with a low accuracy by himself/herself, and by the user manually correcting or adjusting the detection result appropriately if correction is necessary.

By performing enlarged display of the portion which seems to have a strong tendency to have a low detection accuracy, the work can be performed easily even when the correction or adjustment is performed manually.

The contour detector 813 in the embodiment recognizes the shape of the contour by arranging the initial shape Tm at the initial position and performing fitting between the initial shape Tm and the detection target image TI, and the contour detector 813 performs shape recognition processing a plurality of times while changing the initial position to arrange the initial shape Tm.

In a case where the shape recognition processing is performed a plurality of times while changing the position to arrange the initial shape Tm, there is no variation in recognition result at the portion having a high reliability of detection, whereas there is a variation in feature points t as the recognition results at the portion having a low reliability. Thus, it is possible to grasp the reliability of the detection result by seeing the degree of variance among the feature points t.

Further, in the embodiment, the display 13 displays the portion which was determined to include the feature point having a low reliability by the contour detector 813 so as to be enlarged.

This clarifies the portion which needs to be checked for a low reliability of detection, and enables the user to easily find the position to be corrected when the user performs correction or the like to the automatic detection result.

Second Embodiment

Next, with reference to FIGS. 8 to 10, there will be described a second embodiment taking an example of applying the contour detecting device according to the present invention to a printing device (hereinafter, referred to as "nail print device") which prints a nail design on a nail.

Since the configuration and the action or effect of the contour detecting device in the second embodiment are similar to those of the first embodiment, the following description will be made especially for a respect different from the first embodiment.

Figure 8:
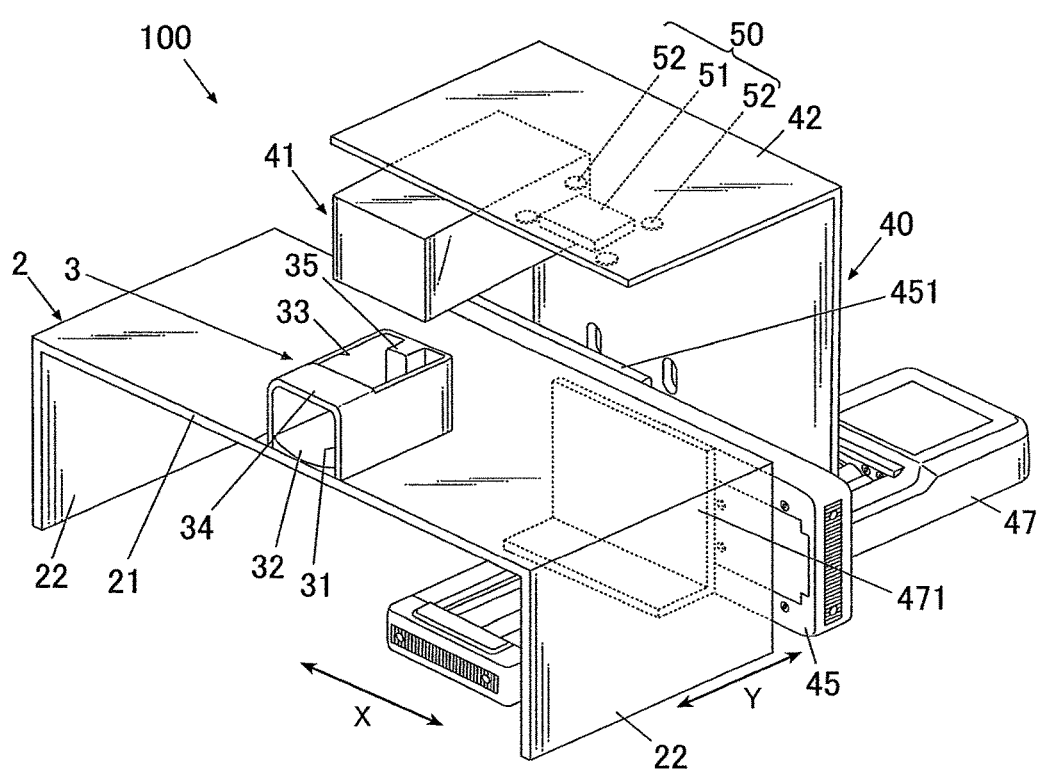
FIG. 8 is a schematic view showing an internal configuration of a nail print device in the embodiment.

FIG. 8 is a schematic view showing the main part configuration example of a nail print device 100 to which the contour detecting device 1 was applied.

Though not shown in FIG. 8, the nail print device 100 is configured by containing the internal configuration shown in FIG. 8 inside the case 11 including the operating unit 12, the display 13 and the like shown in FIG. 1, for example.

As shown in FIG. 8, the nail print device 100 includes a printer 40 in addition to the configuration shown in FIGS. 1 and 3.

The printer 40 is configured by including a print head 41 which is a main body of the printer, a unit supporting member 42, an X-direction movement stage 45 for moving the unit supporting member 42 in the X direction (X direction in FIG. 8, left-right direction of the nail print device 100), an X-direction movement motor 46, a Y-direction movement stage 47 for moving the unit supporting member 42 in a Y direction (Y direction in FIG. 8, front-back direction of the nail print device 100), a Y-direction movement motor 48 and the like.

The print head 41 in the embodiment is an inkjet head which performs printing by an inkjet method. The print head 41 is not limited to the component which performs printing by the inkjet method. For example, the print head 41 may be configured by including a pen or the like to have the tip directly contact the surface of the nail T and perform printing.

FIG. 8 shows an example where the print head 41 and the imaging unit 50 are supported by the unit supporting member 42. The X-direction movement motor 46, the Y-direction movement motor 48 and the like form a head mover 49 (see FIG. 9) which moves the print head 41 and the imaging unit 50 supported by the unit supporting member 42.

By providing the head mover 49, movement can be appropriately made so that the imaging unit 50 is located above the finger fixing unit 3 when a nail which is the detection target is photographed, and the print head 41 is located above the finger fixing unit 3 at the time of printing.

The print head 41, the X-direction movement motor 46 and the Y-direction movement motor 48 in the printer 40 are connected to an after-mentioned printing controller 815 (see FIG. 9) of the control device 80, and controlled by the printing controller 815.

Figure 9:
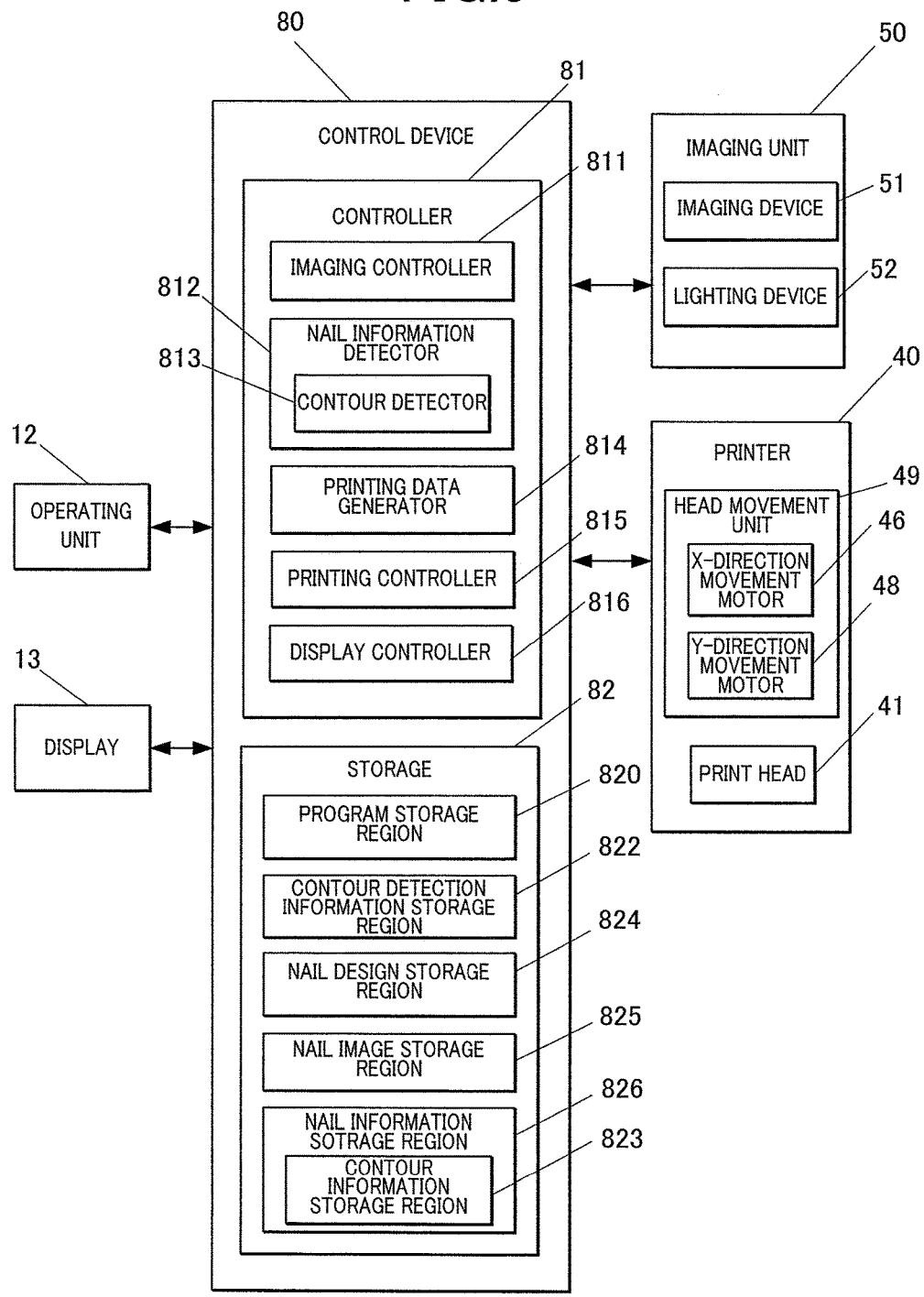
FIG. 9 is a block diagram showing a control configuration of the nail print device in the embodiment.

FIG. 9 is a main part block diagram showing a control configuration in the embodiment.

As shown in FIG. 9, the controller 81 of the control device 80 includes the nail information detector 812 including the contour detector 813, printing data generator 814, a printing controller 815 and a display controller 816 in addition to the imaging controller 811 shown in FIG. 3 for the contour detecting device 1.

The nail information detector 812 detects nail information for the nail T of the printing finger U1 on the basis of the image of the nail T of the printing finger U1 fixed to the finger fixing unit 3 which was photographed by the imaging device 51.

Here, the nail information is, for example, the height of nail T (position of nail T in vertical direction, vertical position of nail T), the inclination angle (inclination angle of nail T, nail curvature) of the surface of nail T with respect to X-Y plane, and the like in addition to the contour of nail T (nail shape, x, y coordinate of horizontal position of nail T) detected by the contour detector 813.

The printing data generator 814 generates data for printing to be performed on the nail T of the printing finger U1 by the print head 41 on the basis of the nail information detected by the nail information detector 812.

Specifically, the printing data generator 814 performs fitting processing of fitting image data of the nail design to the shape of nail T by enlarging, reducing, cutting or the like on the basis of the contour shape of nail T which was detected by the nail information detector 812.

The printing data generator 814 appropriately performs curved surface correction or the like in accordance with the nail information which was detected by the nail information detector 812.

Thus, the printing data of nail design to be printed by the print head 41 is generated.

The printing controller 815 is a controller which outputs a control signal to the printer 40 on the basis of the printing data generated by the printing data generator 814, and controls the X-direction movement motor 46, the Y-direction movement motor 48, the print head 41 and the like of the printer 40 to perform printing according to the printing data on the nail T.

The storage 82 includes a nail design storage region 824, a nail image storage region 825, a nail information storage region 826 including the contour information storage region 823 and the like in addition to those shown in FIG. 3 for the contour detecting device 1.

The nail design storage region 824 stores image data of the nail design to be printed on the nail T.

The nail image storage region 825 stores a nail image of the nail T of the printing finger U1 of the user obtained by the imaging unit 50.

The nail information storage region 826 stores the height of nail T (position in vertical direction of nail T, vertical position of nail T) which was detected by the nail information detector 812, and an inclination angle (inclination angle of nail T, nail curvature) of the surface of the nail T with respect to the X-Y plane and the like in addition to the contour of nail T (nail shape, x, y coordinate of horizontal position of nail T or the like) detected by the contour detector 813, which is stored in the contour information storage region 823.

Since the other configurations are similar to those in the first embodiment, same reference numerals are provided to same members, and the explanation thereof is omitted.

Next, with reference to FIG. 10, printing processing by the nail print device 100 in the embodiment will be described.

In the embodiment, in a case of performing printing on the nail T by the nail print device 100, the user turns on the device, and operates the operating unit 12 such as the print start button. Thus, the instruction to start printing corresponding to the operation is input to the control device 80 of the nail print device 100 (step S21).

When the instruction to start printing is input, the display controller 816 causes the display 13 to display the nail design selection screen for selecting a nail design (step S22), and urges the user to select the nail design.

When the user selects the desired nail design via the operating unit 12 or the like, the nail design to be printed on the nail T is selected in accordance with the selection instruction (step S23).

When the nail design is selected, the display controller 816 causes the display 13 to display the instruction screen instructing to place the finger of the nail which is the printing target at a predetermined position of the finger fixing unit (step S24), and urges the user to fix the nail T (and the finger U1 of the nail T).

The user inserts the finger U1 into the finger fixing unit 3 in accordance with the instruction, and performs positioning and fixing by placing the tip of the nail T on the nail placement unit 35 which is a positioner.

In a state in which the nail T is positioned by the nail placement unit 35, the imaging controller 811 operates the imaging unit 50 to photograph the nail T (step S25), and obtains the nail image TI which is the detection target image including the region of nail T as the detection target.

When the nail image (detection target image) TI is obtained, the contour detector 813 performs contour detection processing of detecting the contour of the nail region in this image (step S26). Since the contents of this contour detection processing are similar to those explained in FIG. 7 of the first embodiment, the explanation thereof is omitted.

The nail information detector 812 detects the height of nail T (position in vertical direction of nail T, vertical position of nail T), the inclination angle of the surface of nail T with respect to X-Y plane (inclination angle of nail T, nail curvature) and the like from the nail image (detection target image) TI.

When the nail information such as the contour of nail T is detected, the printing data generator 814 performs fitting of the selected nail design to the contour of the nail T which was detected, and further performs correction such as curved surface correction appropriately to generate printing data (printing data of nail design) (step S27).

When a portion having a low reliability for the contour of nail T detected in step S26 is displayed on the display 13, the user appropriately performs necessary correction such as movement of the feature point t. In a case where the correction is manually performed, the contour (feature points t forming the contour) after correction is the contour of nail T, and the printing data generator 814 performs fitting or the like of nail design on the basis of the corrected contour.

When the printing data is generated by the printing data generator 814, the printing controller 815 outputs the printing data to the printer 40, and causes the print head 41 to perform printing processing based on the printing data while operating the head mover 49 to appropriately move the print head 41. Thus, the nail design based on the printing data is printed on the nail T (step S28).

Since the other respects of the second embodiment are similar to those of the first embodiment, the explanation thereof is omitted.

As described above, according to the second embodiment, the effects similar to those of the first embodiment can be obtained, and in addition, the following effects can be obtained.

That is, in the embodiment, the nail print device 100 which is the printing device includes the contour detecting device 1 shown in the first embodiment.

Thus, it is possible to perform contour detection with high accuracy by the contour detecting device 1 to the target for which the border with respect to the finger portion and the like cannot be detected easily, that is, the nail T.

After the contour detection processing, before printing is performed, the portion which cannot be secured regarding a reliability by automatic contour detection and the portion which seems to have a low detection accuracy are displayed so as to be enlarged on the display 13 to urge the user to perform check and correction. Thus, it is possible to save the trouble and time for the user to visually search for the portion having a low detection accuracy by himself/herself, it is possible to specify the nail region which is the printing range accurately with the minimum work, and it is possible to perform nail printing with beautiful finish without protrusion and the like.

Though the embodiments of the present invention have been described above, it goes without saying that the present invention is not limited to the embodiments, and various modifications can be made within the scope of the present invention.

For example, though the embodiments show a case where the contour detector 813 performs fitting between the initial shape Tm and the region of the detection target by using the method of ESR, the algorithm which can be used by the contour detector 813 on fitting between the initial shape Tm and the region of the detection target is not limited to ESR.

For example, there can be applied a learning algorithm such as Random Forest which constitutes many class classifiers having a plurality of determination tree structures. In Random Forest, random sampling is performed to the learning samples to create a plurality of sub-sets, the determination tree is constituted for each sub-set, results of a plurality of determination trees are integrated, and thereby classification is performed. Thus, in a case where Random Forest is used as algorithm, in order to obtain recognition results that generate variance at the feature point portion having a low reliability, the shape recognition results for a plurality of times of recognition are obtained by using training results of different sub-sets and performing shape recognition processing a plurality of times.

Moreover, for example, AAM (Active appearance model), ASM (Active shape model), ACM (Active contour model) and the like can be used as algorithm when the contour detector 813 performs fitting between the initial shape Tm and the region of the detection target. In this case, similarly to the case of using ESR shown in the embodiments, the shape recognition results for a plurality of times of recognition are obtained while changing the position to arrange the initial shape Tm.

The embodiments show an example where the recognition results for a plurality of times of recognition are obtained by using a same algorithm and shifting the arrangement position of the initial shape Tm or the like. However, for example, different algorithms may be used to obtain the recognition results for a plurality of times of recognition. Also in this case, variation occurs in the recognition results and variance of the feature point t in the portion having a low reliability of detection is large.

Though the embodiments show a case where the detection target is the nail T, the detection target for which contour detection can be performed by the contour detecting device is not limited to the nail T.

For example, the contour of face, the contours of parts of face such as eyes, nose, mouth or the like may be the detection target.

Also in this case, a plurality of shape recognition results as shown in FIGS. 11A to 11E is obtained.

FIGS. 11A to 11E show an example in which the feature points t21 to t25 are set as the feature points showing the contours of eyebrows, the feature points t31 to t40 are set as the feature points showing the contours of eyes, the feature points t51 to t54 are set as the feature points showing the contour of nose, the feature points t61 to t65 are set as the feature points showing the contour of mouth, and the feature points t71 to t73 are set as the feature points showing the contour of line of chin.

FIG. 11F shows a merging result obtained by merging the recognition results for a plurality of times of recognition shown in FIGS. 11A to 11E.

In the example shown in FIGS. 11A to 11E, among the feature points t, variance of the feature points t71 to t73 showing the contour of the line of chin is large. Thus, in this case, as shown in FIG. 11G, the image enlarging the feature points t71 to t73 and the surrounding portion (that is, portion surrounded by the dashed line in FIG. 11F) is displayed on the display screen of the display 13.

Thus, for example, it is possible to reduce the trouble in adjusting the contour recognition result of face parts for likeness drawing conversion system.

Also for detection other than the contour detection of nail T, face and face parts, the contour detecting device can be broadly applied to detection of contour for any object which is included in an image.

For example, the contour of each target needs to be accurately detected also when various types of processes are performed such as a process of cutting out an image of a person or a target (building, vehicle or the like) photographed with a camera from an image and attaching the cut image to another image, and a process of cutting out images of a target of continuous shots from images to connect them and forming a moving image. In such a case of cutting out an image of a specific object from an image, it is possible to reduce the trouble in region adjustment by applying the contour detecting device of the present invention.

Though the second embodiment shows a case where the printing device is the nail print device 100 which performs printing on the nail T, the printing device is not limited to the nail print device 100, and may perform printing on anything other than the nail T. In a case where the printing target is other than the nail T, there is applied a contour detecting device for detecting the contour defining the region of the printing target.

In a case where the contour detecting device 1 detects the contour of the nail T, the second embodiment shows an example of performing printing in the detected contour after detecting the contour of nail T. However, the processing after contour detection is not limited to the printing processing. For example, automatic nail filing of automatically setting the state of the surface of nail T, automatic nail care and the like may be performed as post-processing.

In a case where the detection target is various organs and the like included in a medical image photographed by a medical imaging device, as processing after the contour detection, a doctor or the like may perform image diagnosis, provide information such as the health state to the patient and the like.

Although several embodiments of the present invention have been described above, the scope of the present invention is not limited to the above described embodiments and includes the scope of the present invention that is described in the claims and the equivalents thereof.

What is claimed is:

1. A contour detecting device, comprising:
 a display; and
 a processor, wherein
 the processor obtains a detection target image which is obtained by imaging a detection target, detects a contour of the detection target from the detection target image by performing shape recognition a plurality of times, the shape recognition recognizing a shape of the contour of the detection target, and causes the display to display a detection result of contour detection processing, and
 in the contour detection processing, for feature points forming contours obtained by performing the shape recognition the plurality of times, variance in the shape recognition that is performed the plurality of times is calculated for each corresponding feature points, and a feature point for which a value of the calculated variance is a set value or greater is determined to be a feature point which has a low reliability,
 wherein the processor causes the display to display a portion corresponding to the feature point which is determined to have the low reliability so that the portion is able to be distinguished in the contour obtained by the shape recognition.

2. The contour detecting device according to claim 1, wherein, in the shape recognition, an initial shape is arranged at an initial position, the shape of the contour is recognized by performing fitting between the initial shape and the detection target image, and the shape recognition is performed the plurality of times while changing the initial position.

3. The contour detecting device according to claim 1, wherein the processor causes the display to display the portion corresponding to the feature point which is determined to have the low reliability so that the portion is enlarged in the contour obtained by the shape recognition.

4. The contour detecting device according to claim 1, further comprising a print head,
 wherein the processor causes the print head to perform printing in the contour.

5. A contour detecting method, comprising:
 obtaining a detection target image which is obtained by imaging a detection target;
 detecting a contour of the detection target from the detection target image by performing shape recognition processing a plurality of times, the shape recognition processing recognizing a shape of the contour of the detection target; and
 causing a detection result of the contour to be displayed, wherein
 in the detecting of the contour, for feature points forming contours which are recognition results of the shape recognition processing, variance in the shape recognition processing that is performed the plurality of times is calculated for each corresponding feature points, and a feature point for which a value of the calculated variance is a set value or greater is determined to be a feature point which has a low reliability.

6. A non-transitory storage medium storing a program that causes a computer of a contour detecting device to perform functions comprising:

obtaining a detection target image which is obtained by imaging a detection target;

detecting a contour of the detection target from the detection target image by performing shape recognition a plurality of times, the shape recognition recognizing a shape of the contour of the detection target; and causing a detection result of the detecting of the contour to be displayed, wherein in the detecting of the contour, for feature points forming contours which are recognition results of the shape recognition, variance in the shape recognition that is performed the plurality of times is calculated for each corresponding feature points, and a feature point for which a value of the calculated variance is a set value or greater is determined to be a feature point which has a low reliability.

\* \* \* \* \*